United States Patent [19]

Stevens

[11] Patent Number: 5,056,544

[45] Date of Patent: Oct. 15, 1991

[54] RECREATIONAL VEHICLE REMOTELY CONTROLLED TANK DRAIN VALVE AND FLUSHING METHOD

[76] Inventor: Charles F. Stevens, 19991 Wrightwood Ct., Yorba Linda, Calif. 92886

[21] Appl. No.: 466,250

[22] Filed: Jan. 16, 1990

Related U.S. Application Data

[62] Division of Ser. No. 134,768, Dec. 18, 1987, Pat. No. 4,903,716.

[51] Int. Cl.⁵ .................. B08B 9/08; F16K 31/143
[52] U.S. Cl. .................. 134/166 R; 134/96; 251/14; 251/326
[58] Field of Search .......... 251/14, 62, 63.4, 63.5, 251/63.6, 326, 328; 134/166 R, 96

[56] References Cited

U.S. PATENT DOCUMENTS

| | | | |
|---|---|---|---|
| 1,545,696 | 7/1925 | Riley | 251/14 X |
| 2,012,003 | 8/1935 | Hall, Jr. | 251/14 |
| 2,630,829 | 3/1953 | Shafer | 251/14 |
| 2,710,017 | 6/1955 | Carter | 251/14 X |
| 2,885,172 | 5/1959 | Natho | 251/14 |
| 3,198,034 | 8/1965 | De White et al. | 251/62 X |
| 3,333,814 | 8/1967 | Sargent | 251/326 X |
| 3,407,824 | 10/1968 | Ray | 134/56 R |
| 3,941,349 | 3/1976 | Pierson | 251/326 X |
| 4,279,402 | 7/1981 | Wey et al. | 251/63.5 X |
| 4,475,710 | 10/1984 | Leupers | 251/63.6 X |
| 4,667,351 | 5/1987 | Williams | 134/166 R X |
| 4,709,901 | 12/1987 | Pierson et al. | 251/63.5 X |
| 4,905,325 | 3/1990 | Colditz | 134/166 R X |

FOREIGN PATENT DOCUMENTS

850031 9/1960 United Kingdom ............ 251/14

Primary Examiner—John Rivell
Attorney, Agent, or Firm—Allen A. Dicke, Jr.

[57] ABSTRACT

The recreational vehicle has a valve which is remotely controlled to permit remote draining of the drain water tank. The method of flushing the tank, including remote control of the drain valves is also included.

7 Claims, 4 Drawing Sheets

RECREATIONAL VEHICLE REMOTELY CONTROLLED TANK DRAIN VALVE AND FLUSHING METHOD

CROSS-REFERENCE

This application is a division of my prior application, Ser. No. 134,768, filed Dec. 18, 1987, for "Recreational Vehicle Tank Flushing System", now U.S. Pat. No. 4,903,716, granted Feb. 27, 1990.

FIELD OF THE INVENTION

This invention is directed to a tank flushing system particularly suited for the multiple rinsing and application of sanitizing chemicals into recreational vehicle water tanks.

BACKGROUND OF THE INVENTION

Self-contained recreational vehicles have potable water tanks which deliver fresh water, sometimes both hot and cold water, to the cooking, washing, and toilet areas of the recreational vehicles. In view of present-day environmental conditions, the waste water cannot be simply discharged on the street or the campground. It is retained in tanks until discharge can be achieved at an appropriate waste water discharge location.

In accordance with present structure and technique, the gray water tank receives water from the sinks and showers, and the black water tank receives the waste water from the toilet. The recreational vehicle is taken to a dump station; the drain valves are opened on these two tanks; and the contents thereof are drained away. In order to rinse the tanks, a hose is thrust up through the drain line or down through the sink and toilet bowel, and fresh water is squirted into the tank through the hose, and rinsing and drainage occurs until the waste water runs clear. Such an operation is distasteful and appears to be unsanitary. Thus, there is a need for ease and convenience of flushing recreational vehicle tanks.

SUMMARY OF THE INVENTION

In order to aid in the understanding of this invention, it can be stated in essentially summary form that it is directed to a recreational vehicle tank flushing system wherein inlet and outlet connections are provided for the tank, and the connections and supplies thereto are controlled by a system which progressively drains the tank, flushes it (preferably by means of a spray head), and adds a sanitizing liquid to the tank so that recreational vehicle tanks can be flushed and sanitized.

It is thus an object and advantage of this invention to provide a recreational vehicle tank flushing system which can accommodate one or more of the potable water, gray water and black water tanks of a recreational vehicles to flush the tank and supply sanitizing liquid thereto.

It is a further object and advantage of this invention to provide a recreational vehicle tank flushing system wherein a control system successively controls equipment so that one or more selected recreational vehicle tanks can be automatically flushed.

Other objects and advantages of this invention will become apparent from a study of the following portion of the specification, the claims and the attached drawings.

DESCRIPTION OF THE PREFERRED EMBODIMENT

Figure 1:
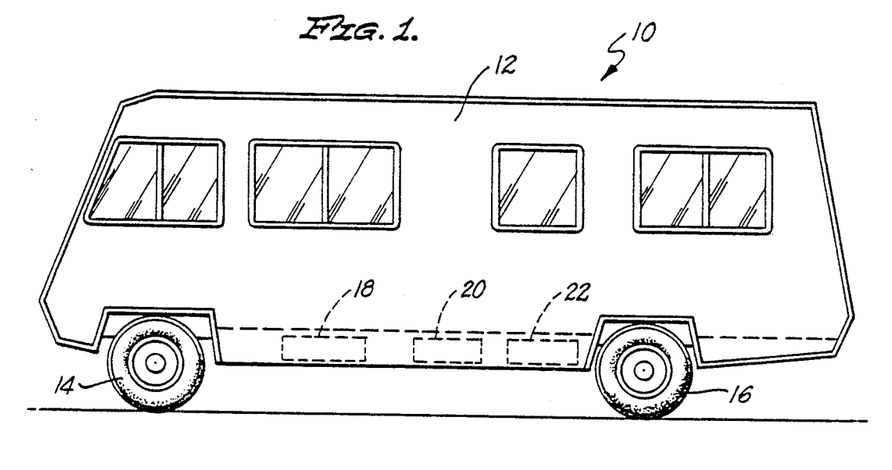
FIG. 1 is a side-elevational view of a recreational vehicle showing tanks in association therewith which can be flushed by the recreational vehicle tank flushing system of this invention.

Recreational vehicle 10 is generally indicated in FIG. 1. The recreational vehicle 10 has a body 12 which contains amenities for cooking, resting, toilette and protection from the inclement environment. The recreational vehicle 10 has wheels thereunder, such as the front and rear pairs of wheels 14 and 16 for travel of the vehicle. The vehicle 10 may be a self-propelled vehicle, as illustrated, or may be a trailer or semitrailer for towing behind another vehicle. Furthermore, the body 12 may be configured for placement on top of another vehicle, such as in the bed of a pickup. The recreational vehicle 12 is a generalized illustration of a recreational vehicle which is self-contained in that it has its own potable water supply, as shown by tank 18. It also has waste water storage tanks in the form of gray water tank 20 and black water tank 22.

Figure 4:
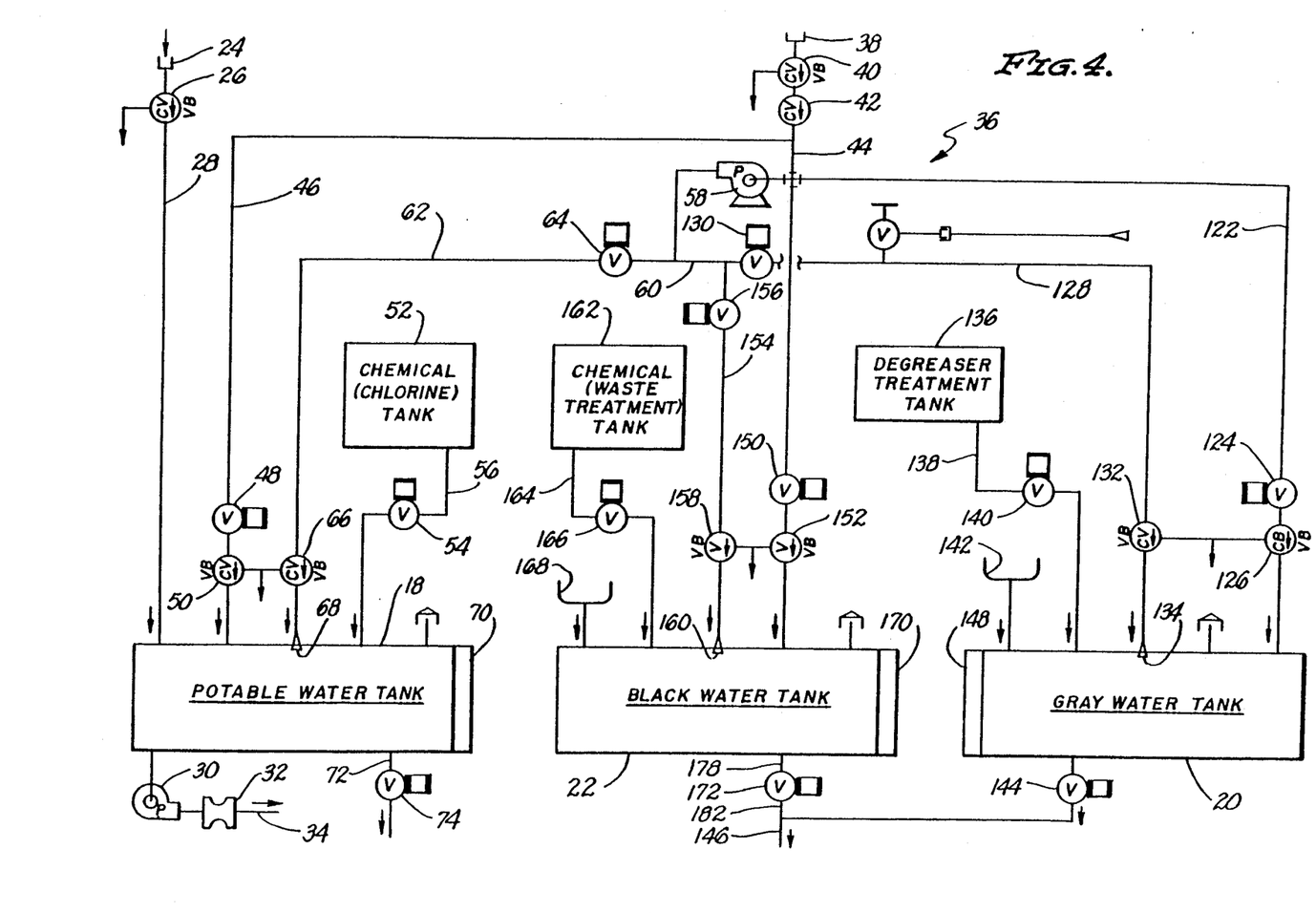
FIG. 4 is a plumbing schematic plan of various connections to the water tanks.

As seen in FIG. 4, potable water tank 18 has a pressurized water inlet connection 24, such as a hose coupling, which delivers pressurized water through check valve 26. Check valve 26 is a special check valve in that it also has a vacuum breaker therein and a drain thereon. Check valve 26 thus permits only down flow from water inlet connection 24 to water inlet line 28 and not up-flow from the tank 18 to the water source connected to inlet connection 24. In addition, should there be a vacuum at valve 26, the line is vented to atmosphere and a drain is opened to discharge any water at the valve to a position below the recreational vehicle where it will not damage parts of the recreational vehicle. Water inlet line 28 is connected to potable water tank 18 to fill the tank. When water in the tank is to be used in the recreational vehicle for any use therein, it is pumped out by pump 30 through integrating flow meter 32 to utility line 34, which supplies the water needs of the recreational vehicle.

Figure 3:
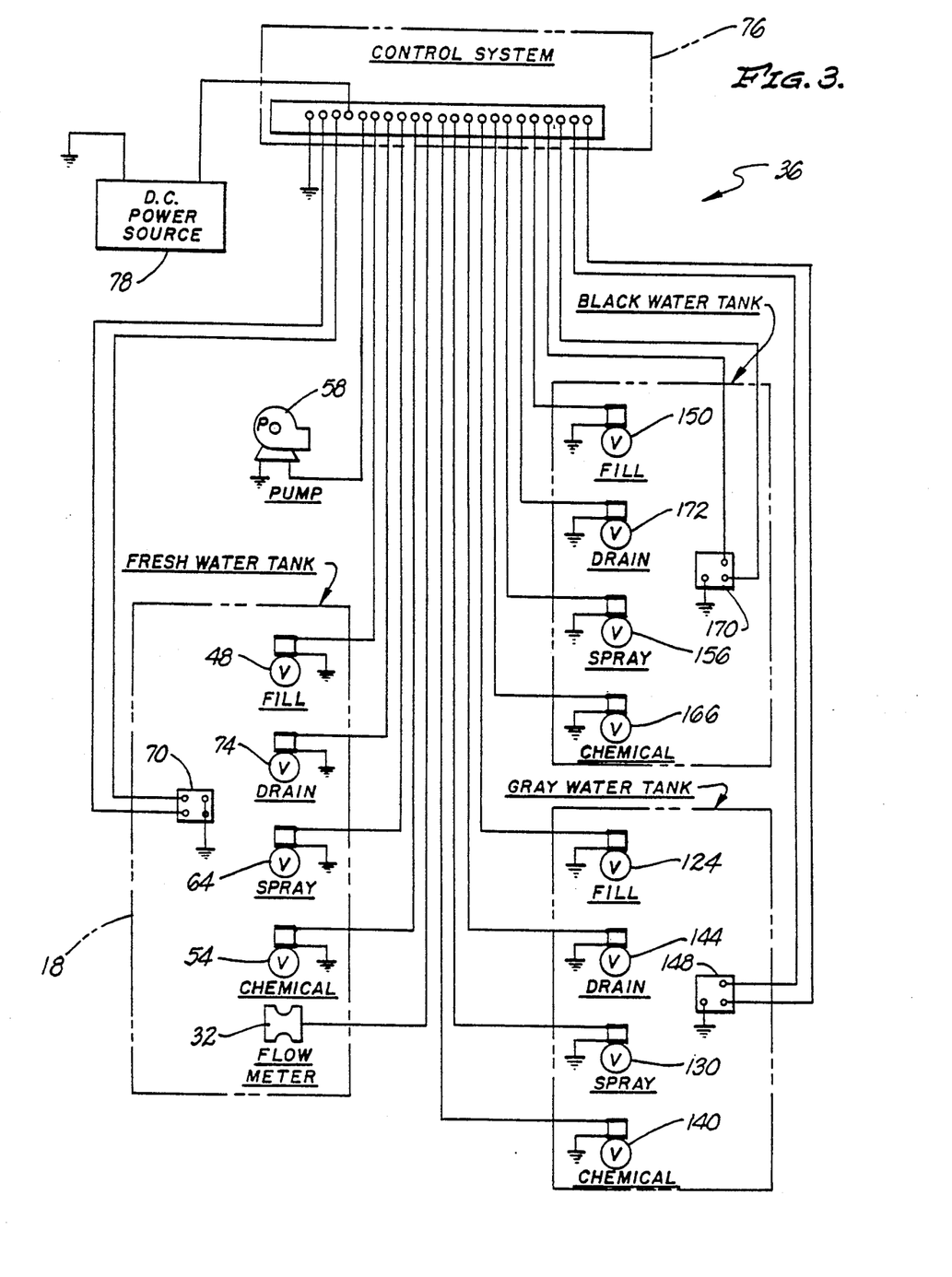
FIG. 3 is a block diagram showing the connections between the control system and the various units associated with the various tanks.

When at a base location, a location where there is pressurized water and drain opportunity available, the potable water tank 18 can be flushed and sanitized by means of the flushing system of this system generally indicated at 36 in FIGS. 3 and 4. Water inlet connection 38 is for connection to a conventional potable water supply, such as delivered by a hose from a domestic water source. Connector 38 is connected to vacuum breaker check valve 40 which is serially connected to check valve 42. Check valve redundancy is provided for safety. Water main 44 is thus provided with domestic water under pressure. Fill line 46 delivers water under pressure to fill solenoid valve 48, which is connected through vacuum breaker check valve 50 to potable water tank 18 to fill the tank.

Some domestic water supplies do not have enough chlorine or chloramine therein to satisfactorily inhibit the growth of algae in the closed tank 18. Thus, it is desirable to add chlorine to the tank, sometimes to the water therein intended for domestic use, but it is more particularly helpful during the flushing cycle. Thus, chemical tank 52 contains a chlorine or other antibiotic algicide and/or bactericide. Preferably, the chemical tank is positioned above potable water tank 18 so that the liquid chemicals in the tank 52 can be gravitationally fed to the water tank. Solenoid valve 54 is connected in chemical feed line 56 to control flow of chemical into potable water tank 18.

Pump 58 is connected to take suction from water main 44 and deliver water under pressure to high-pressure main 60. Potable water tank spray line 62 is connected through potable water tank spray control solenoid valve 64 and through vacuum breaker check valve 66 to spray nozzle 68 in potable water tank 18. The spray nozzle is located with respect to the tank and is of such pattern that when the tank is empty, the spray nozzle delivers a forceful water spray to all of the tank interior walls.

Potable water tank 18 is also equipped with a high- and low-water sensor 70 which indicates when the tank is empty and when it is full. In addition, tank 18 is equipped with drain line 72 which has therein solenoid valve 74. By means of solenoid valve 74, tank 18 can be drained.

An inspection of FIG. 3 shows these electrical components associated with potable water tank 18 are electrically connected to control system 76. The control system 76 is fed with power from a suitable source, such as battery 78 of the recreational vehicle. Control system 76 contains logic elements, switches and timers to accomplish the cycle described below.

Figure 2:
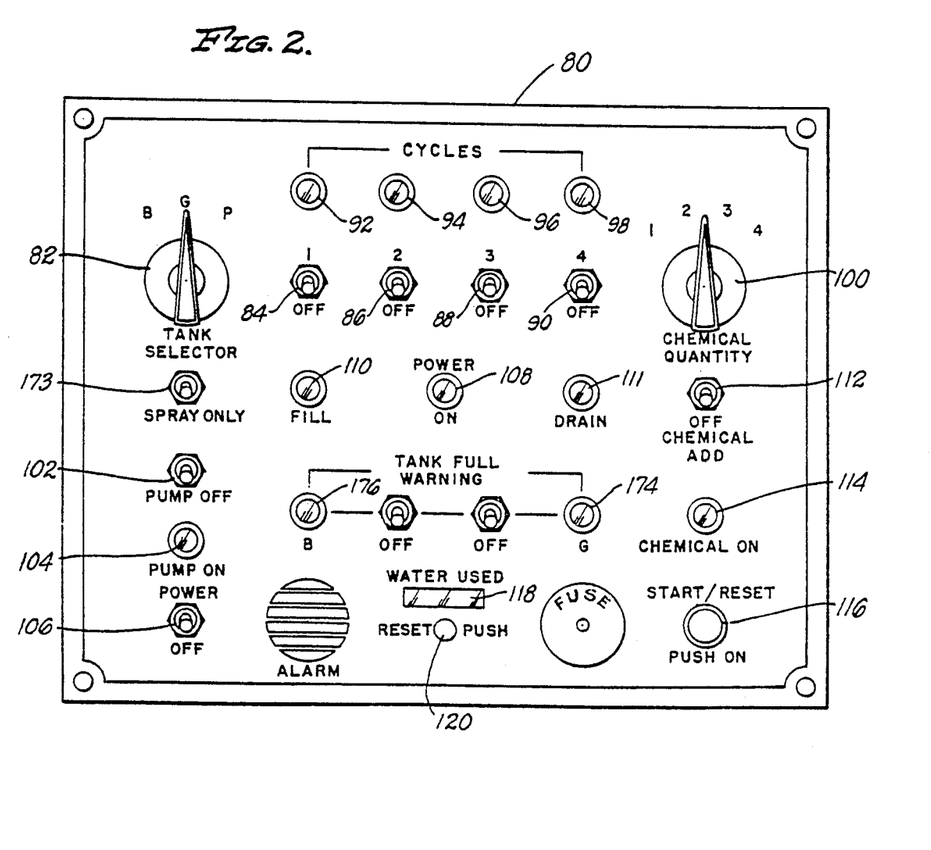
FIG. 2 is a front view of the control panel in the preferred embodiment of the tank flushing system of this invention.

FIG. 2 shows the control panel 80 of the control system and its associated switches and indicators. The flushing system is capable of flushing any one of the three tanks 18, 20 and 22 or all of them sequentially. Thus the system is provided with selector switch 82 which can select between flushing the black water tank, flushing the gray water tank, flushing the potable water tank, or flushing all three tanks sequentially. For the purpose of the initial cycle description, the tank selector switch 82 is switched to P, meaning the potable water tank 18. The system is capable of one or more flush cycles, and the number of cycles desired is selected by switches 84, 86, 88 and 90. The position of these switches indicates the number of cycles selected. Indicator lights 92, 94, 96 and 98 are positioned above the cycle selector switches and indicate the cycle at which the system is operating. Selector switch 100 is connected to a timer which controls chemical dispensing solenoid valve 54 to permit the user to select the time the valve will be open and, thus, select the amount of chemical dispensed into the potable water tank 18.

When the pressure is adequate in the domestic water supply, the pressure in main 60 may be sufficiently high for proper spraying. In such a case, the operation of booster pump 58 would not be required. Switch 102 turns pump 58 on, when the pressure is otherwise inadequate. Indicator light 104 shows when the pump is on. The entire control system is supplied by power, and switch 106 turns the power on. Indicator light 108 indicates that power is on; indicator light 110 indicates when the tank is filling; indicator light 111 shows when the drain is open. In addition, switch 112 can be turned on or off to determine whether or not chemicals will be added to the tank during the flush cycle. Indicator light 114 shows when the switch is on. Start button 116 starts the cycle.

The tank flushing system operates by having the control system receive and send out suitable signals. First, the water is drained out of tank 18 by opening of valve 74. An empty tank signal from sensor 70 then causes the control system to close valve 74 and spray water in through spray nozzle 68 for a predetermined time or until the level sensor 70 indicates the tank 18 is full. During the early part of the spray cycle, the solenoid valve 54 is open for a short time, predetermined by the setting of selector switch 100, to gravitationally dispense a chemical, such as an algicide and/or bactericide into tank 18. When sensor 70 indicates the tank is full, valve 64 is closed and valve 74 is opened to permit tank 18 to gravitationally empty. If switch 84 is on indicating desire for only one cycle and the switches 86, 88 and 90 are off, only one such cycle is performed. If switch 86 is on, then two of such cycles are performed, and so on for three and four flushing cycles, when switches 88 and 90 are on, respectively. When the cycle is completed, valves 48, 64, 54 and 74 are all closed, when is the non-energized state of the solenoid valves.

If the user, at this point, desires to fill tank 18, he reconnects the filling supply to connector 24 and fills the tank through fill line 28. When he uses water from the tank, flow meter 32 indicates the amount of water dispensed from the tank, and this shows up on indicator 118 on control panel 80. In order to calibrate the flow meter indicator to the state of fullness of tank 18, when the tank 18 is filled, the flow meter indicator 118 is reset by reset button 120.

The control system controls the various valves in order to spray, flush and drain the tank. Considering the potable water tank 18, the control system first drains the tank by opening drain valve 74. When the level sensor 70 indicates the tank is empty, spray valve 64 is opened. If pump 58 is running, the pressure in high-pressure main 60 is higher than in water main 44. If the pressure in water main 44 is adequate, the pump 58 need not be running so long as the spray head 68 provides an adequate and forceful spray. While the spray is operating, drain valve 74 is open to drain away the water which is sprayed in and to prevent an accumulation of water from interfering with the forcefulness of the spray. When the spray has been active for an adequate length of time, it is turned off by closing valve 64. At the same time, drain valve 74 is closed. At this time, fill valve 48 is opened for filling the potable water tank 18 from water main 46. At the same time, valve 54 is opened for a short time to allow an adequate amount of the sterilizing chemical to flow into the potable water tank. The valve 54 is closed after a short time, but the valve 48 remains open until level sensor 70 indicates a full tank. Thereupon, valve 48 is closed and drain valve 74 is opened.

When level sensor 70 indicates an empty tank, then the system is ready for the next part of the cleaning cycle. If the switch 86 is on, another spraying and flushing cycle is performed. At the end of that cycle, presuming switches 88 and 90 are off, the system closes valve 74, opens fill valve 48, and fills the tank with the next supply of potable water. When level sensor 70 indicates a full tank, valve 48 is closed. Now the tank 48 contains the water which will next be used. If filling of the potable water tank 18 is desired between flushing cycles, a filling hose is attached to connector 24 and filling occurs through fill line 28 without involvement of the tank flushing system. When filling is complete by either method, reset button 120 is pushed to reset the indicator on flow meter 32 so that the user knows how much water remains.

The gray water tank 20 is equipped with fill line 122 connected from water main 44, through fill control solenoid valve 124 and vacuum breaker check valve 126 to tank 20. In addition, spray line 128 is connected through spray solenoid valve 130 and vacuum breaker check valve 132 to spray nozzle 134 in gray water tank 20.

Chemical tank 136 is connected by line 138, which is controlled by solenoid valve 140 to supply tank 20. Basin 142 receives water which is gravitationally delivered to the gray water tank. Basin 142 may be the kitchen sink, bathroom sink or shower pan. Thus, the water which enters the gray water tank 20 is more likely to be greasy. Thus, the chemical tank 136 carries a degreaser. In addition, gray water tank 20 is fitted with solenoid-operated drain valve 144, which is connected by drain line 146, which is temporarily connected to a suitable line or vessel to receive such water. Gray water tank 20 is fitted with level sensor 148, which emits signals when the tank is full or empty.

In the flushing cycle of gray water tank 20, tank selector 82 is turned to the gray water tank. As indicated in FIG. 2, the chemical quantity is selected by selector switch 100. If supplemental pressure for spray is required, switch 102 is turned on. If the addition of chemical from tank 136 is required, it is chosen by the positioning switch 112, and the number of flushing cycles is selected by turning on one of the switches 84, 86, 88 and 90. Presuming switch 86 is turned on, two flushing cycles are chosen. With the power switch 106 on, the start switch 116 is pressed. First, drain valve 144 is opened and the contents of the gray water tank is drained away. When level sensor 148 indicates an empty tank, valve 130 is opened and spray water is delivered through spray nozzle 134. This nozzle is of such shape and is so positioned that the walls of the gray water tank are washed down. After a predetermined spray time, for example five minutes, valve 130 is closed, drain valve 144 is closed, and fill valve 124 is opened. The gray water tank is filled until the level sensor indicates that it is full. Thereupon, fill valve 124 is closed and drain valve 144 is opened. Since the user has selected two flush cycles, the drain valve 144 stays open, valve 130 is opened, and spray again occurs for about five minutes. At the end of the five-minute spray, spray valve 130 is closed, drain valve 144 is closed, and fill valve 124 is opened. Again, the gray water tank 20 is filled. When the level sensor 148 indicates the tank is full, valve 124 is closed and valve 144 is opened to drain the tank. When the level sensor 148 indicates an empty tank, drain valve 144 is closed. Thereupon, chemical valve 140 is opened for a predetermined length of time determined by the setting of selector switch 140. The tank 136 is preferably above gray water tank 20 so as to gravitationally dispense the degreaser. After a predetermined amount of time, valve 140 is closed and the gray water tank 20 is ready to be returned to service and accept gray water.

Black water tank 22 is similarly equipped. Water main 44 is connected through solenoid controlled water fill valve 150 and through vacuum breaker check valve 152 to black water tank 22. In addition, spray line 154 is connected through spray valve 156 to highpressure main 60 and is connected through check valve 158 to spray nozzle 160 in black water tank 22.

In addition, chemical tank 162 has its discharge line 164 connected through solenoid valve 166 to black water tank 22. Since the black water tank will contain organic materials, the chemical in tank 162 is usually a liquid enzyme solution for breakdown of the organic materials. Water closet 168 is connected to discharge into the black water tank 22. Black water tank 22 also has level sensor 170 connected thereto to indicate level of tank filling. Solenoid operated drain valve 172 is in the black water drain line which connects to drain line 146.

The black water tank flushing cycle is similar. On the control panel 80, power switch 106 is turned on, booster pump 102 is turned on, if required, tank selector 82 is turned to B for the black water tank, and the number of flushing cycles desired is selected by switches 84, 86, 88 and 90. Assuming two flushing cycles are desired, switch 86 is turned on. The quantity of chemical is selected by switch 100, and the fact that chemical addition as desired is chosen by turning switch 112 on. Thereupon, the start switch 116 is pressed. First, drain valve 172 is opened. When level sensor 170 indicates that black water tank 22 is empty, valve 156 is opened so that spray nozzle 160 sprays down the walls of the black water tank 22. This spray-down continues for about five minutes, and thereupon, drain valve 172 is closed, spray valve 156 is closed, and fill valve 150 is opened. Black water tank 22 is filled, and when a full tank is signalled by tank level sensor 170, fill valve 150 is closed and drain valve 172 is opened. The contents of the black water tank are thus drained out. When level sensor 170 indicates that the tank is empty, spray valve 156 is again opened for about five minutes. At the conclusion of spraying, drain valve 172 is closed, fill valve 150 is opened, and the tank is filled until level sensor 170 indicates a full tank. Again, fill valve 150 is closed and drain valve 172 is opened to drain the tank. When the tank is empty, as indicated by level sensor 170, drain valve 172 is closed.

With a black water tank, it is not desirable to start service with an empty tank. Thus, as a final step to flushing the black water tank and preparing it for return to service, fill valve 150 is opened for a short time to discharge about two gallons of water into the black water tank. In addition, chemical valve 160 is opened for a predetermined length of time to gravitationally discharge a selected amount of chemical from tank 162 to the black water tank 22. A small amount of water in the bottom of the black water tank together with the waste treatment chemical discharged from tank 162 maintains fluidity in the black water tank. If more flushing cycles had been selected, the system would similarly operate through the selected number of cycles.

Each of the cycles thus described includes one or more fill and empty cycles as part or the sanitizing operation. For those operators who wish to save time, water or waste volume, a cleansing cycle is offered which includes the spraying but not the subsequent fill and drain portion of the cycle. Switch 173 is turned to "spray only", and the system goes through the same cycle (except for fill and drain) for the same number of cycles 23 as set by switches 84-90. In this way, water time and total waste volume is conserved.

One of the problems of recreational vehicle usage is the unexpected running out of potable water and the unexpected filling of the gray water tank or the black water tank. The flow indicator 118 shows the status of use of potable water tank. Since level sensors 148 and 170 are already equipped on the gray water tank and black water tank, they can also be employed to give full tank warnings to the user. For this reason, level sensor 148 is connected to indicator 174 on the control panel, and level sensor 170 is connected to indicator 176 on the control panel. These indicators will show when the tanks are full to avoid overfilling. In addition to these visual indicators, an audible indicator can be connected thereto. Switches are connected to disconnect the audible indicator so that it is not actuated during the flushing cycle.

The tank selector 82 has positions for each of the individual tanks so that any one may be flushed and treated. If the user desires to sequentially flush each of the three tanks, he can turn the selector switch 82 to a position indicated by "ALL" so that the three tank flushing cycles are sequentially performed without the need for the user's attention.

Figures 5, 6:
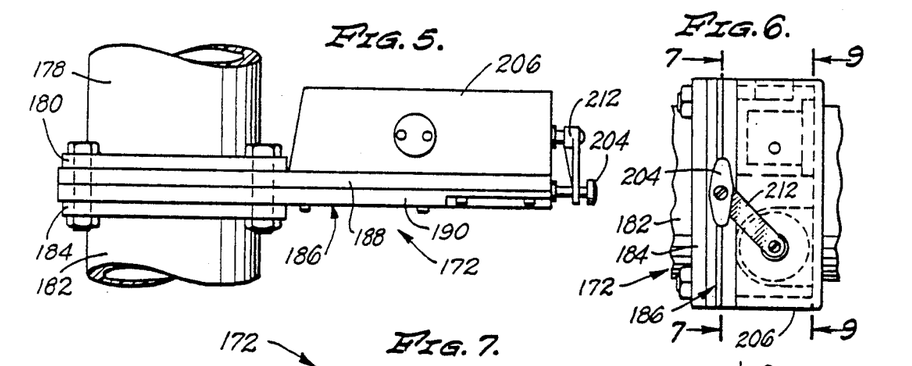
FIG. 5 is a plan view of the preferred drain valve used for draining one or more of the tanks of the recreational vehicle.
FIG. 6 is an end view thereof.
Figure 7:
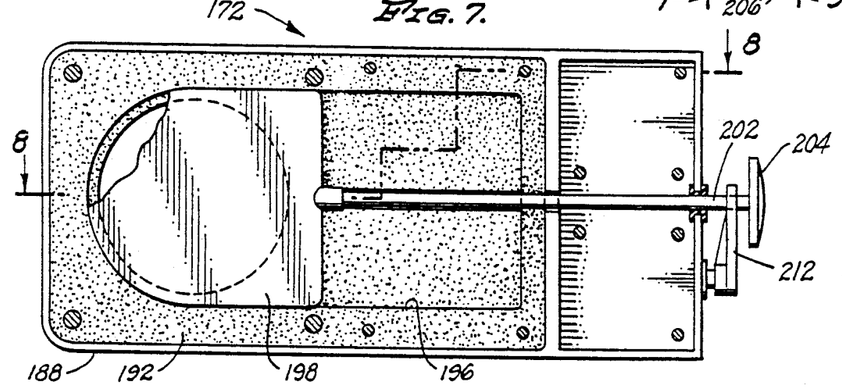
FIG. 7 is an enlarged section taken generally along line 7—7 of FIG. 6.
Figures 8, 9:
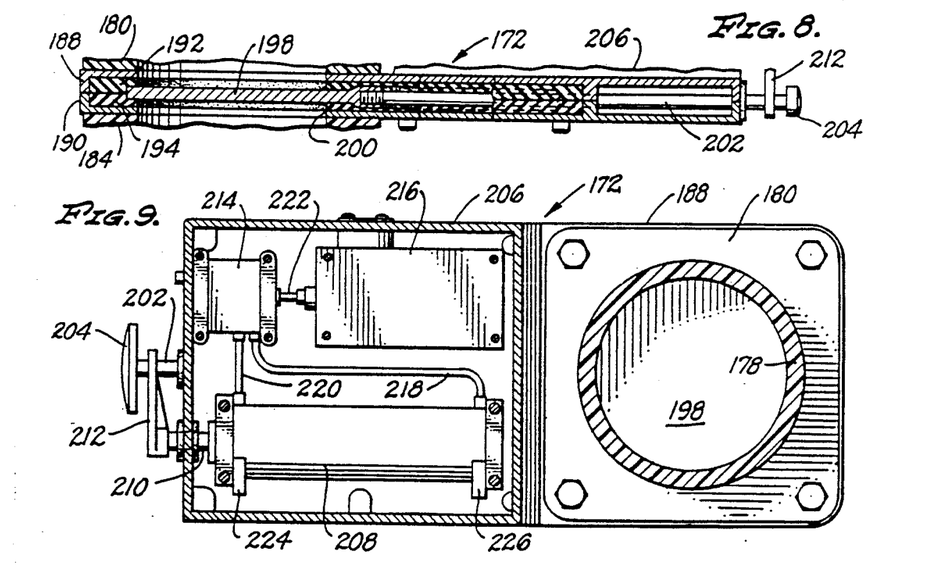
FIG. 8 is a section taken generally along the line 8—8 of FIG. 7.
FIG. 9 is an enlarged section taken generally along the line 9—9 of FIG. 6.

The valve 172 must have a large passage therethrough in order to properly handle the material to be discharged therethrough. A slide valve or gate valve with a 3" diameter opening is suitable for such use, and a preferred embodiment of the valve is shown in FIGS. 5 through 9. Manually operated gate valves of such nature are available. A preferred embodiment of the electric ally operated main valve is shown in these figures. Drain line 178 has a flange 180 thereon, while drain line 184 has flange 182 thereon. Valve 172 has a two-piece body 186 which includes an upper body half 188 and a lower body half 190. As is seen in FIGS. 5 and 8, the flanges engage the body halves and bolts clamp the structure together. As is seen in FIG. 8, each of the body halves has a pocket therein in which is contained a gasket. Upper gasket 192 is shown in FIGS. 7 and 8, and lower gasket 194 is shown in FIG. 8. These gaskets define a pocket 196, see FIG. 7, in which gate 198 slides. In the left position shown in FIG. 7, the gate covers the opening 200 through the body which is in line with the opening through the drain line 182. Gate 198 can be moved rightward in the pocket to completely uncover the opening 200. Operating rod 202 is connected to the gate and extends rightward out of valve body 186. A seal around the operating rod is not usually required because the direct face-to-face engagement of the gate with the gaskets prevents leakage into the pocket. The right end of the operating rod carries handle 204 for manual stroking of the gate from the leftmost closed position shown in FIG. 7 to the right position of the gate where it lies in the pocket and uncovers the opening.

Housing 206, shown in side elevation in FIGURE 5 and in plan view in FIG. 9 with its cover removed, contains mechanism by which the gate is stroked between its open and closed positions. Double-ended air cylinder 208 has a piston therein which is connected to piston rod 210. The piston rod carries an external arm 212 which is engageable with the operating rod 202. For example, the operating rod 202 can have an annular groove therearound, and arm 212 can have an arcuate hook which swings into the groove. In this way, cylinder actuation moves the valve.

Reversing air valve 214 is connected to receive air from air compressor 216 and is connected to deliver air to and receive air from the cylinder through head end line 218 and rod end line 220. Valve 214 is the reversing valve that supplies air from the compressor to one of the cylinder lines and vents the other and alternates the pressure supply and vent between the head end and rod end lines. The reversing air valve 214 is solenoid-actuated and reversing is accomplished each time the piston reaches the end of its stroke. The end of the piston stroke is sensed by reed switches 224 and 226 which are actuated by a magnet on the piston. To open and close valve 172 as required, the valve shifts and supplies air under pressure to one of the lines 218 or 220 and vents the other. For the purpose of example, it supplies air pressure to head end line 218 and the piston rod moves out to draw out the operating valve 202 to open the valve. The control system only maintains the compressor 216 on for a short time, for example, five seconds, and at the end of that time shuts off. Due to normal leakage, the pressure in pressure line 222 decreases substantially to atmospheric pressure, but the valve gate stays in place. When the control system desires that the valve be closed, the compressor 216 is again energized, air pressure goes up in line 222, and the solenois shifts valve 214 to supply the pressure to rod end line 220 in vent line 218. This draws the piston rod 210 into the cylinder and thrusts operating rod 202 in the direction to close valve vent 172. In this way, a long stroke, large bore gate or slide valve is easily power-operated.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A drain valve for a recreational vehicle tank flushing system, said drain valve comprising:

a body having a drain passage therethrough, said body being a two-piece body including a first body half and a second body half, said first and second body halves having facing flanges for engagement to each other and means for clamping said flanges together, at least one of said body halves having a pocket therein, first and second gaskets between said first and second body halves, at least one of said gaskets having a gate pocket therein, said drain passage extending through said flanges and including openings in said gaskets between said flanges;

a gate in said gate pocket in said gasket, said gate being movable from a position where it obstructs and closes said passage and is in contact with said first and second gaskets to seal said passage to a position where it is away from obstruction of said passage;

an operating rod, said operating rod being smooth and being fixed to said gate and extending out of said body comprising said first and second flanges;

a fluid cylinder, said fluid cylinder having a piston rod therein, said piston rod lying substantially parallel to and detachably connected to said operating rod;

a fluid control valve connected to said fluid cylinder to move the piston therein and said piston rod; and a source of fluid under pressure mounted on said body connected to said control valve for supplying fluid under pressure to said cylinder to move said piston therein to open and close said drain valve.

2. The drain valve for a recreational vehicle tank of claim 1 wherein said means for supplying fluid under pressure is an air compressor mounted with said drain valve body and said fluid control valve is a reversing air control valve which selectively supplies air under pressure to one end of said piston and drains the other.

3. The drain valve for a recreational vehicle tank of claim 2 wherein the connection between said piston rod and said operating rod is disconnectable so that said operating rod can be manually operated.

4. The drain valve of claim 2 wherein said fluid control valve is controlled by a control system so that each time fluid under pressure is supplied thereto, the pressure delivered from said reversing valve to said cylinder is reversed.

5. A drain valve for a recreational vehicle tank flushing system, said drain valve comprising:

a body having a drain passage therethrough, said body being comprised of first and second flange body portions, said flanges being detachably secured to each other, at least one pocket formed in said flange body portion, two gaskets positioned in said pocket, said gaskets defining a gate pocket;

a gate slidably mounted in said gate pocket between said gaskets, said gate being movable from a position where it obstructs and closes said passage and seals with said gaskets to a position where it is away from obstruction of said passage;

an operating rod, said operating rod being smooth and being fixed to said gate, operating rod extending out of said body, said operating rod having a straight pull handle thereon so that by direct manual engagement with said straight pull handle, said gate can be moved between its obstructing and nonobstructing positions, said operating rod having an annular groove thereon;

a fluid cylinder, said fluid cylinder having a piston rod thereon, said piston rod having an arm thereon, a hook on said arm for selective engagement in said annular groove;

a fluid control valve connected to said fluid cylinder to move the piston therein and said piston rod; and a source of fluid under pressure mounted on said body connected to said control valve for supplying fluid under pressure to said cylinder to move said piston thereinto to open and close said drain valve.

6. A recreational vehicle waste water tank flushing system comprising:

a control system;

a drain valve for connection to the recreational vehicle tank for draining the waste water tank, said drain valve being connected to said control system for opening and closing upon command by said control system, said drain valve having a body having a drain passage therethrough, said body being a twopiece body including a first body half and a second body half, said first and second body halves having facing flanges for engagement to each other and means for clamping said flanges together, at least one of said body halves having a pocket therein, first and second gaskets between said first and second body halves, at least one of said gaskets having a gate pocket therein, said drain passage extending through said flanges and including openings in said gaskets between said flanges;

a gate in said gate pocket in said gasket, said gate being movable from a position where it obstructs and closes said passage and is in contact with said first and second gaskets to seal said passage to a position where it is away from obstruction of said passage;

an operating rod, said operating rod being smooth and being fixed to said gate and extending out of said body comprising said first and second flanges;

a fluid cylinder, said fluid cylinder having a piston rod therein, said piston rod lying substantially parallel to and detachably connected to said operating rod;

a fluid control valve connected to said fluid cylinder to move the piston therein and said piston rod;

a source of fluid under pressure connected to said control valve for supplying fluid under pressure to said cylinder to move said piston therein to open and close said drain valve;

a water spray nozzle for positioning in the recreational vehicle waste water tank for spraying the walls of the tank;

a pressurized water supply valve connected to said spray nozzle for supplying water to said spray nozzle, said pressurized water control valve being connected to said control system, said water supply valve being for connection to the waste water tank and being connected to be controlled by said control system so that said control system opens said spray water valve and opens said drain valve for spraying down the walls of the waste water tank and thereupon said control system closes said spray water valve and said drain water valve and opens said water supply valve to fill the waste water tank and upon completion of filling said control system closes said water supply valve and opens said drain valve until the waste water tank is empty; and a fluid chemical degreaser dispensing tank, a chemical degreaser dispensing control valve connected to said chemical degreaser dispensing tank, said chemical degreaser dispensing control valve being for connection to the recreational vehicle waste water tank so that upon opening of said chemical degreaser dispensing valve, chemical is dispensed to the recreational vehicle waste water tank, said chemical dispensing valve being connected to said control system so that said control system controls said valves to spray the walls of the recreational vehicle waste water tank and thereupon said control system closes said drain valve and opens said chemical supply valve to place degreaser treatment chemical in the waste water tank.

7. A recreational vehicle waste water tank flushing system comprising:

a control system;

a drain valve for connection to the recreational vehicle tank for draining the waste water tank, said drain valve being connected to said control system for opening and closing upon command by said control system, said drain valve having a body having a drain passage therethrough, said body being a twopiece body including a first body half and a second body half, said first and second body halves having facing flanges for engagement to each other and means for clamping said flanges together, at least one of said body halves having a pocket therein, first and second gaskets between said first and second body halves, at least one of said gaskets having a gate pocket therein, said drain passage extending through said flanges and including openings in said gaskets between said flanges;

a gate in said gate pocket in said gasket, said gate being movable from a position where it obstructs and closes said passage and is in contact with said first and second gaskets to seal said passage to a position where it is away from obstruction of said passage;

an operating rod, said operating rod being smooth and being fixed to said gate and extending out of said body comprising said first and second flanges;

a linear actuator detachably connected to said gate operating rod and to said control system to move said gate to open and close said drain valve in accordance with commands of said control system;

a water spray nozzle for positioning in the recreational vehicle waste water tank for spraying the walls of the tank;

a pressurized water supply valve connected to said spray nozzle for supplying water to said spray nozzle, said pressurized water control valve being connected to said control system, said water supply valve being for connection to the waste water tank and being connected to be controlled by said control system so that said control system opens said spray water valve and opens said drain valve for spraying down the walls of the waste water tank and thereupon said control system closes said spray water valve and said drain water valve and opens said water supply valve to fill the waste water tank and upon completion of filling said control system closes said water supply valve and opens said drain valve until the waste water tank is empty; and a fluid chemical degreaser dispensing tank, a chemical degreaser dispensing control valve connected to said chemical degreaser dispensing tank, said chemical degreaser dispensing control valve being for connection to the recreational vehicle waste water tank so that upon opening of said chemical degreaser dispensing valve, chemical is dispensed to the recreational vehicle waste water tank, said chemical dispensing valve being connected to said control system so that said control system controls said valves to spray the walls of the recreational vehicle waste water tank and thereupon said control system closes said drain valve and opens said chemical supply valve to place degreaser treatment chemical in the waste water tank.

* * * * *